March 8, 1955     J. A. CROSS     2,703,610
MILK EVAPORATION APPARATUS
Original Filed Dec. 16, 1946     3 Sheets-Sheet 1
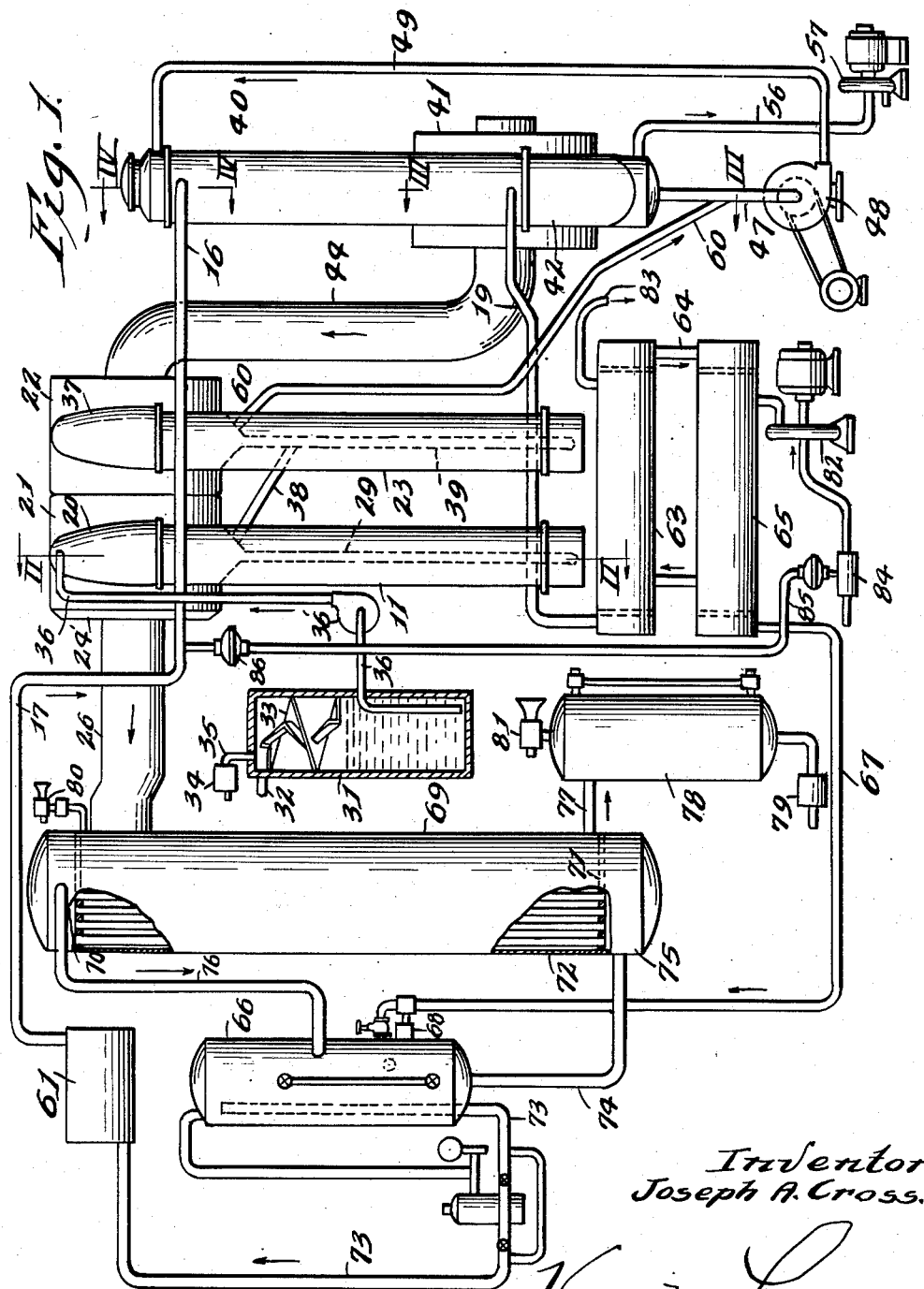
Inventor,
Joseph A. Cross.
By Victor M. Faucett
Attorney.

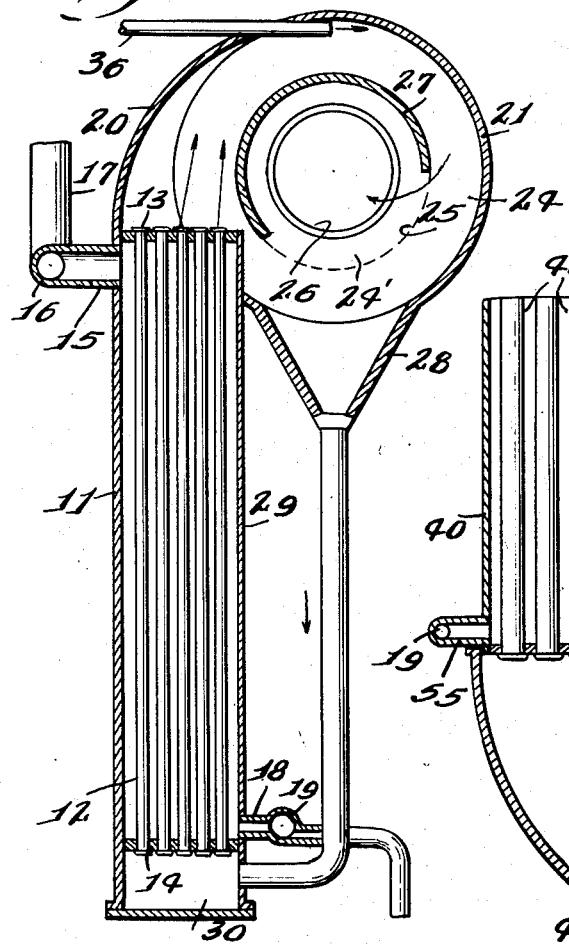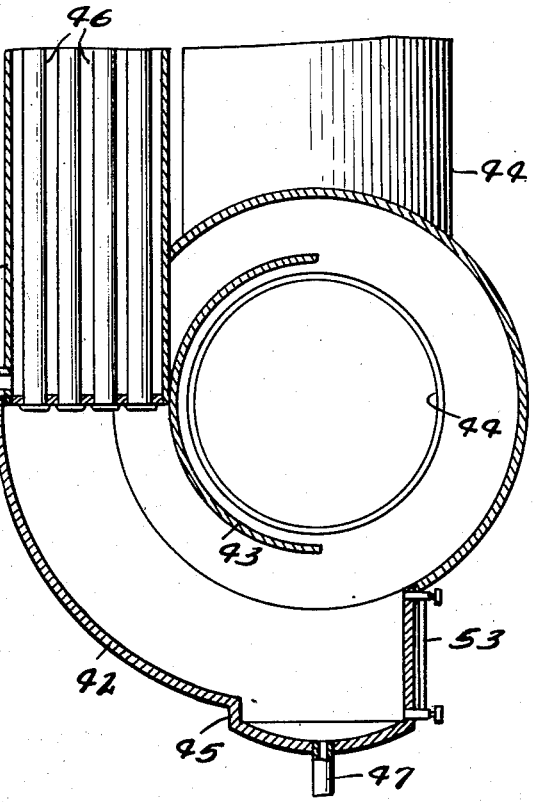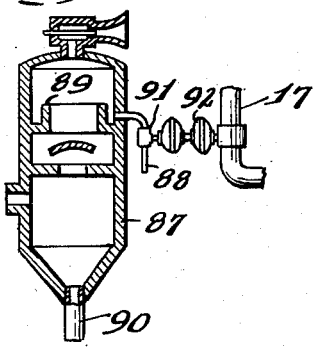

March 8, 1955 J. A. CROSS 2,703,610
MILK EVAPORATION APPARATUS
Original Filed Dec. 16, 1946 3 Sheets-Sheet 3
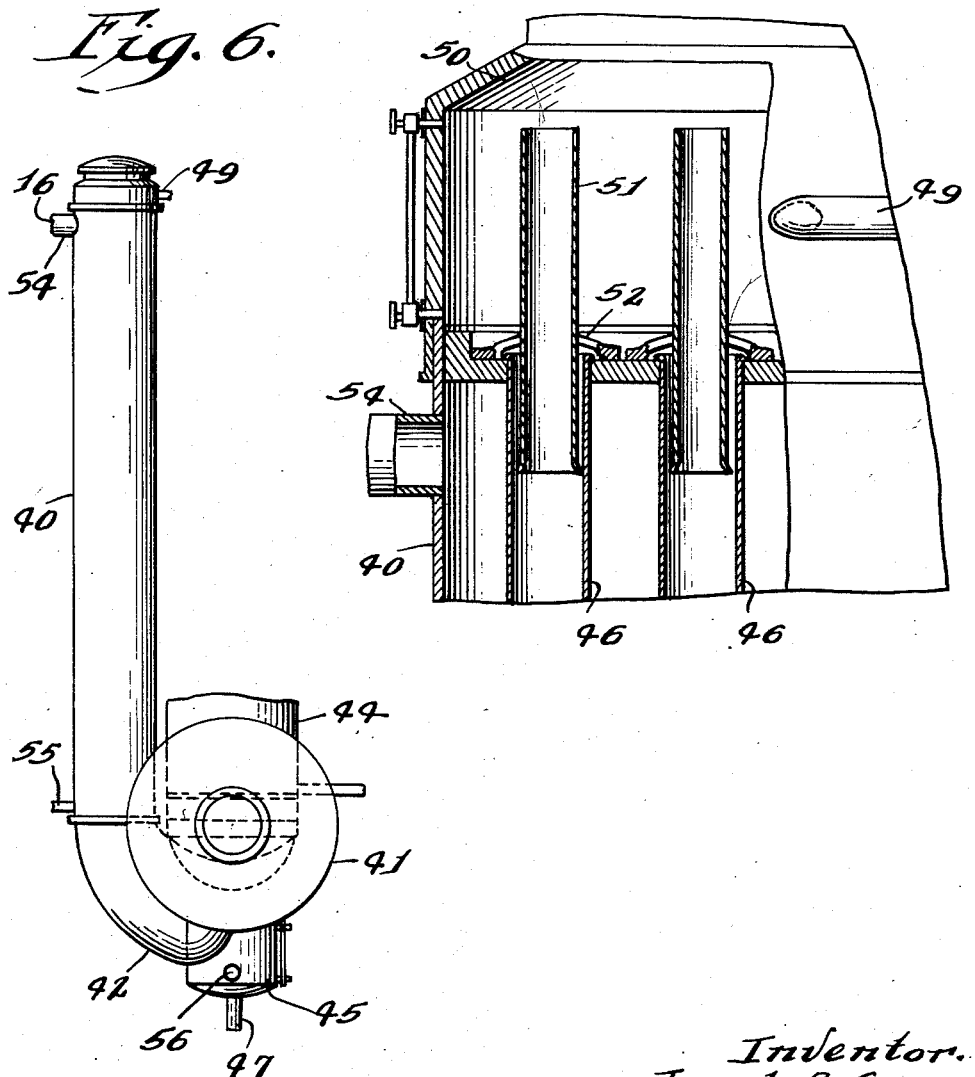
Inventor.
Joseph A. Cross.
By Victor M. Faucett
Attorney.

United States Patent Office 2,703,610
Patented Mar. 8, 1955

2,703,610

MILK EVAPORATION APPARATUS

Joseph A. Cross, Westerville, Ohio, assignor to Mojonnier Bros., Inc., Chicago, Ill., a corporation of Illinois Original application December 16, 1946, Serial No. 716,581, now Patent No. 2,570,213, dated October 9, 1951. Divided and this application September 28, 1951, Serial No. 248,747

1 Claim. (Cl. 159—17)

This application is a division of my co-pending application Serial Number 716,581, filed December 16, 1946, now Patent No. 2,570,213.

This invention relates to apparatus for evaporating milk to a high density under vacuum and below its atmospheric boiling point.

The invention provides apparatus for rapid evaporation of the milk at a temperature range low enough to avoid the substantial alteration or modification of the solids which has heretofore occurred in milk condensing processes which subject the milk to higher temperatures during evaporation. The invention employs a low temperature range and a brief evaporation period to preserve as far as possible the normal flavor and other characteristics of fresh milk, so that when it is reconstituted back to normal density by the addition of water the product will resemble fresh milk as closely as possible, in texture and flavor.

An outstanding characteristic of the invention is its use of a refrigerating cycle in which a refrigerant gas is compressed and its latent heat of liquefaction employed to vaporize water from the milk, after which the liquefied refrigerant is cooled and re-evaporated in heat exchange relationship with the water vapor derived from the milk, this latter step effecting the condensation of the water vapor and exerting a high vacuum upon the milk undergoing evaporation. The liquid refrigerant thus vaporized is recompressed and recycled again through the process.

One of the objects of the invention is to provide apparatus utilizing an evaporation process for milk at a temperature range below its atmospheric boiling point.

Another object of the invention is to provide apparatus utilizing a refrigeration cycle for vaporizing water from the milk and for condensing the water vapor and avoiding such high temperatures as have heretofore been used in the evaporation of milk.

Another object is to provide an apparatus capable of evaporating milk under vacuum at relatively low temperatures designed to accomplish a reduction in volume of as much as two thirds or more while the milk passes through the system in roughly from three to five minutes.

Another object of the invention is to provide means for subjecting the milk to evaporation while in film formation in connected evaporators through which milk at successively higher densities is recirculated and in which the water vapor is directly separated from the milk and evacuated to a condenser.

Other objects and advantages of the invention will be specifically alluded to hereinafter or will become apparent from a reading of the specification.

In the drawings:

Figure 1 is a diagrammatic layout of an apparatus by means of which the invention may be practiced;

Figure 2 is a sectional view on the line II—II of Figure 1;

Figure 3 is a sectional view on the line III—III of Figure 1;

Figure 4 is a sectional view on the line IV—IV of Figure 1;

Figure 5 is a sectional view showing a condenser which may be used in the process; and Figure 6 is an end view of one of the evaporator units used in the invention.

Referring further to the drawings, the apparatus includes an evaporator system through which the milk flows while being condensed to the desired density, a condenser in which the water vapor derived from the milk is condensed, a compressor for compressing a refrigerant gas which is introduced into the evaporators for supplying the heat for the evaporation of the milk, a condenser and cooler for completing the condensation of any portion of the refrigerant gas not condensed in the evaporators during heat exchange with the milk, the cooler serving to withdraw excess heat from the condensed liquid refrigerant. The liquid refrigerant is then introduced into the water vapor condenser in heat exchange relation with the water vapor, where the liquid refrigerant there becomes vaporized and is returned to the compressor for reconversion and circulation through the system.

In the apparatus which I have selected to illustrate the invention, the first evaporator unit through which the milk flows includes a vertical tube chest 11 having a plurality of vertical tubes 12 fixed in the upper tube plate 13 and the lower tube plate 14 (Figs. 1 and 2).

The compressed refrigerant gas (the heating medium) is introduced into the space surrounding the vertical tubes by means of an inlet pipe 15 connected with a common supply pipe 16 which supplies refrigerant gas to the other two evaporator units from the pipe 17 leading from the compressor. In the normal operation of the apparatus most if not all of the compressed refrigerant gas introduced into any tube chest will be condensed and will be evacuated from the bottom of each of the first two identical tube chests through a pipe 18 leading to a common draw off pipe 19 communicating with the lower end of each evaporator unit.

Connected with the top of the first evaporator unit is a curved hood 20 which opens directly into a cylindrical drum 21 for discharging the water vapor and unevaporated milk which emerge from the upper ends of the tubes.

The drum 21 is joined to a drum 22 of substantially identical construction, the latter being associated with the second tube chest 23. An inwardly turned flange 24 at the right end of the drum 21, whose circular inner margin 25 is projected upon Figure 2, provides a central opening 25 for the withdrawal through drum 21 of the vapors collected in the drum 22. The vapor from both of these drums is then evacuated through a vapor duct 26. To assist in imparting a centrifugal motion to the upwardly rising water vapors and any entrained droplets of milk, I provide an arcuate baffle 27 extending longitudinally of the drum 21, supported at the margin 25 of flange 24 at the right end of drum 21 and supported on the left end wall 24' of drum 21, thus being positioned to cause the water vapors and droplets to rise and circulate above the baffle, throwing the droplets against the wall of the drum and allowing the vapors as they pass over and beyond the edge of the baffle to escape centrally to the vapor duct 26.

The droplets of milk which then fall from the drum and any milk overflowing from the upper ends of tubes 12 will enter a conical sump 28 and pass downwardly through the downflow pipe 29 and enter the chamber 30 at the bottom of the tube chest 11. In the normal operation of the device the milk will recirculate many times upwardly through the tubes 12 and downwardly through the pipe 29 under the thermosyphon action promoted by the heat being applied to the milk and further aided by the water vapor bubbles which form in the milk and rise in the tubes 12.

The milk to be evaporated is introduced into the first evaporator unit as follows. A deaeration tank 31 (see Figure 1) is supplied with milk through a pipe 32, by means of a pump or any other suitable means not shown, the milk being allowed to flow downwardly in film formation over a spiral channel 33, giving ample opportunity for a vacuum pump 34 of any appropriate design connected by pipe 35 with the top of the tank to evacuate air which may be contained in the milk. This preliminary separation of air is desirable to prevent foaming of the milk during its evaporation in the system and also to avoid counter-pressures resulting from unseparated air which might accumulate later in the water vapor condenser. The milk after passing over the spiral channel falls to the bottom of the tank and is withdrawn therefrom by means of the pipe 36 and a variable speed or variable output pump 36' of any suitable design and thus may be regulatably supplied to the system and introduced with sufficient speed to flow tangentially into the top of the drum 21 after which it then flows down into the sump 28 at the bottom of the drum.

The next adjacent evaporator unit comprising the tube chest 23 and the drum 22 constitutes the second evaporator stage of the system. Tube chest 23 is identical with tube chest 11 and its hood 37 is likewise identical with the hood 20. The milk to be evaporated in the second evaporator flows by gravity thereinto by means of a pipe 38 connected with the sump 28 and with the downflow pipe or return leg 39 associated with the second evaporator unit. The holding and flow capacities of the first unit should be such that the amount per unit of time of milk returning through down leg 29 for repeated recirculation through the first unit will be many times the amount per unit of time discharged through pipe 38. The milk entering from pipe 38 by reason of its previous repeated recirculation through the first evaporator unit, has already been considerably condensed and flows downwardly through the pipe 39 and thence upwardly through the tubes in the tube chest 23, and is repeatedly recirculated through the second unit.

Compressed refrigerant gas for supplying the heat to this second unit is supplied by a short pipe positioned as is the pipe 15 in Figure 2, while the condensed refrigerant is withdrawn from the bottom in a pipe positioned as is the pipe 18 and connected with the common drawoff pipe 19.

The milk being recirculated in the first evaporator unit is of course the most dilute, hence the largest amount of evaporation will take place in that evaporator. A somewhat lower rate of evaporation will take place in the second unit, but to facilitate the obtaining of a condensed product under efficient operating conditions, I prefer a different type of evaporator for the third unit. Because the milk flowing through the third unit is of greater density I prefer to use a falling film type of evaporator. This unit is shown in a side elevation in Figure 6 and includes a tube chest 40 containing a plurality of vertical tubes mounted in tube sheets at their upper and lower ends, of standard construction. The vapor separation drum 41 associated with the tube chest 40 is connected with its lower end, the water vapors from the tubes being conducted into the drum by a curved hood 42 which tends to impart a whirling motion to the vapors. A longitudinally extending baffle 43 positioned as shown in Figure 3 and secured in the drum in any suitable manner serves to prevent the direct flow of the vapors into the outlet duct 44, causing them to continue a swirling motion, and enabling milk droplets, if any, entrained with the vapor to slide along the outer surface of the drum and thence drop downwardly into the sump 45.

In order to promote the highest efficiency in this falling film unit it is contemplated that the vertical tubes indicated as 46 in Figure 3 will be covered with a film of milk entirely to their lower ends. Therefore, some of the milk will drop down into the sump 45 and passing downwardly through the pipe 47 will be recirculated by means of the pump 48 upwardly through the pipe 49 into the space above the top of the tube chest.

Turning now to Figure 4 of the drawings, a partial sectional view of the construction at the top of the falling film tube chest is shown. Each of these vertical tubes terminates as indicated in the upper tube plate. Within the chamber 50 and extending upwardly thereinto and downwardly into the tubes 46 I provide the removable open-ended tubes 51, one for each of the tubes 46. These removable tubes are supported centrally and vertically by means of spiders such as 52 having three or more legs which rest on the upper tube sheet. It will be noted that the lower end of each tube 51 is flared outwardly to cause the milk which flows between these tubes and the inner surfaces of the tubes 46 to flow as a film downwardly beyond that point. The tubes 51 are removable for purposes of cleaning. The milk delivered by the pump 48 is introduced into the chamber 50 and allowed to accumulate above the upper tube sheet. It is apparent that the depth of the layer of milk above this tube sheet will determine the hydrostatic pressure of that body of milk and by increasing or decreasing the depth of this layer of milk the rate of flow past the flared lower ends of the tubes 51 may be increased or decreased, thus enabling the operator to cause the tubes 46 to be completely covered with film but not excessively. To this end, the pump 48 may be provided with a variable speed drive and a sight glass 53, shown only in Figure 3 may be provided on the sump to assure the operator that the pump is always primed.

The compressed refrigerant gas, the heating medium, is supplied to the upper end of tube chest 40 by means of the pipe 54 connected with pipe 16, and the condensed refrigerant is withdrawn from the bottom of the tube chest by means of the pipe 55 and thence flows into the common draw-off pipe 19 which is connected with the bottoms of all three evaporator units.

The milk is recirculated through the third evaporator unit repeatedly to allow it to be evaporated to the ultimate desired density. A continuous draw-off of milk at the desired density is obtained through the pipe 56 connected with the evacuator pump 57, which also should have a variable speed or variable output so that the continuous draw-off may be properly regulated to harmonize with the rate of feed and the final product density desired.

Briefly, the milk continuously enters the first evaporator unit at the top thereof and is recirculated many times through the first unit being considerably condensed therein. A continuous stream of partially condensed milk flows through the pipe 38 from the sump of the first evaporator unit into the downflow pipe 39 of the second evaporator unit, wherein the milk is again recirculated and further condensed. This milk further condensed also flows continuously from the sump of the second evaporator unit through a pipe 60 into the downflow pipe 47 connected with the sump of the third evaporator unit. In this last unit, the milk is recirculated and subjected to evaporation until the operator is able to maintain a continuous draw-off through pipe 56 of milk at the desired density.

Turning now to the heating medium, a refrigerant gas, which is preferably Freon 11 or Freon 21, both of which are well known refrigerants, is employed in the system. A compressor 61 of any suitable or well known design is employed for compressing the gas. The type of compressor to be employed should be whichever type will operate most efficiently with whatever refrigerant gas is used. While I mention Freon 11 and Freon 21 it should be understood that other refrigerant gases having characteristics suitable for use in this system may be employed.

If Freon 11 is employed, it should be compressed to about 61 pounds absolute pressure, at which pressure it would have a superheated temperature of about 160° F. and would condense at about 140° F. in the evaporators and cause water to evaporate from the milk at about 140° F. The compressed gas is intended to flow continuously through the pipe 17 into the upper ends of the spaces surrounding the tubes in the three tube chests heretofore described.

During heat exchange with the milk contained on the insides of the tubes it is desired that the Freon 11 will largely, if not wholly, condense and will be withdrawn from the bottoms of the tube chests through the common pipe 19 for passage through a tubular water cooled condenser 63 of standard construction and thence through pipe 64 into a tubular water cooled cooler 65. The liquefied refrigerant then will flow into a receiver 66 through the pipe 67 under control of a value such as the valve 68 which may be a liquid level controlled valve. Under these conditions water will evaporate from the milk at about 140° F. and the water vapor from all three of the evaporator units will be conducted through the pipe 26 into the vertical tubular condenser 69. This condenser is of common construction having an upper tube sheet 70 and a lower tube sheet 71 with a plurality of vertical tubes 72 fixed in these tube sheets.

As the water vapor has a temperature of about 140° F. and a pressure of about 2$\frac{9}{10}$ pounds absolute pressure, the refrigerant, in order to be able to condense the water vapor should be cooled to about 130° F. This may require that some of the liquid refrigerant be flashed off into the top of the receiver 66 from which it may be withdrawn through the pipe 73 to the compressor 61.

The refrigerant, cooled to about 130° F., is introduced through the pipe 74 into the bottom chamber 75 of the condenser 69 and is allowed to flow and boil upwardly through the tubes, the latent heat of evaporation of the liquid refrigerant being obtained from the water vapor, condensing the water vapor at about 140° F. and vaporizing the refrigerant at about 130° F. The refrigerant gas is then withdrawn from the top of the condenser through the pipe 76 and conducted into the receiver 66 from which it is withdrawn by the pump 61.

The condensed water vapor is evacuated from bottom of the tube chests through the pipe 77 into a tank 78 from which it is evacuated by means of a pump 79. Non-condensing ejectors of ordinary construction indicated as 80 and 81 may be employed for ejecting any non-condensible gases such as air which may have accumulated along with the water vapor. For the ejectors a small amount of high pressure steam may be provided. The refrigerant gas which evolves from the liquid refrigerant in the condenser 69 will ordinarily have a pressure of about 39 pounds absolute pressure, if Freon 11 be used, and after passing through the compressor 61, will have a pressure of about 61 pounds absolute.

In order to remove from the refrigerant the excess heat not required in the system, which consists principally of the heat of compression, and possibly other heat picked up from the surrounding atmosphere, water is supplied by means of the pump 82 and is circulated through the cooler 65 and condenser 63 and discharged through a pipe 83. In order that the amount of cooling shall be just enough to discharge the excess heat, I provide a pressure controlled valve 84 which is connected by the pipe 85 to the underside of a diaphragm in the pressure regulator 86, this diaphragm being exposed to the pressure of the compressed gas in the line 17. Hence if the pressure tends to rise in the line 17, more water will be pumped through the cooler 65 by the pump 82 which will get rid of the excess heat which has caused the higher pressure. Thus, the system may be operated at substantially uniform pressure and temperature conditions, which are conducive to the highest efficiency of a system of this kind.

An alternative method of ridding the refrigerant of excess heat, or which even may be used jointly with the cooler 65, is the condenser 87 (Fig. 5) which may be substituted for ejector 80, attached to condenser 69, provided water is available at a temperature lower than the water vapor in condenser 69. Such water would be pumped through pipe 88 into condenser 87 around weir 89, and falling over the weir would mingle with and condense water vapor from condenser 69, the water and condensate being discharged through pipe 90 and a barometric leg not shown. The inflow of water would be controlled by a diaphragm controlled valve 91, in turn controlled by diaphragm 92 operatively connected with compressed gas line 17. The pressure in this line would determine the amount of water vapor which would be condensed by cold water from outside the system, thus by modifying the heat exchange load in condenser 69 tending to maintain uniform heat balance throughout the refrigeration cycle. The regulating valve should be of a type capable of ready adjustment.

Freon 21 will be used in the same manner as is the Freon 11 with only such differences in pressure as may be peculiar to that gas. For example, Freon 21 should be compressed to about 100 pounds absolute pressure for use in the evaporator, at which pressure it will have a saturated temperature of about 140° F. and a superheated temperature of about 160° F. and will condense at about 140° F. in the evaporators. It will cause the water to evaporate from the milk at about 140° F. and the liquefied refrigerant before being used in the water vapor condenser 69 should be cooled to about 130° F. The gas evolving from the liquid Freon 21 which evaporates in this condenser at about 130° F. will have a pressure of about 65 pounds absolute, and after passing through the compressor will be restored to 100 pounds absolute.

It will be noted that the system and the method herein described operates at different pressures and temperatures than the evaporation process described in my co-pending application. This process at a higher evaporating temperature for the milk is very efficient and is recommended for use where it is satisfactory to condense milk at about 140° F.

While I have shown two evaporators having an upward flow of milk and one evaporator which provides a falling film flow of milk it should be understood that all of the evaporators may be of the first type, that is, with the upward flow, if desired, or that there may be more than two evaporators providing for upward flow of milk in combination with one falling film type at the end of the system. Also one upward flow and one falling film flow type in the order named may be used. If the milk is to be concentrated to a viscous state a falling film evaporator is most efficient for the final concentration stage, but if a viscous concentration is not aimed for, the upward flow evaporators may suffice.

For tubular evaporators of either type shown, an economical size to manufacture and use is one in which the tubes have a length in the neighborhood of 10 to 12 ft. Where an evaporator of such dimensions and providing for the upward flow of milk is used I find that the temperature differential herein described between the superheated temperature of the refrigerant which supplies the heat for evaporating the milk and the evaporating temperature for the milk is adequate to cause the milk to boil substantially throughout the length of the vertical tubes. Under such conditions bubbles of water vapor will be formed throughout the entire height of these tubes and rising through the tubes will bring about a rapid thermosyphon circulation of the milk. There will therefore be a rapid and continuous overflow of milk from the tops of these tubes, some of this milk will merely overflow and fall into the adjoining sump, for example the sump 28 shown in Figure 2, while milk droplets carried along with the water vapor will be thrown centrifugally around the drum and will fall into the sump, while the water vapor itself will separate from the milk and flow into the water vapor outlet pipe 26.

Hence, evaporators such as 11 and 23, in addition to requiring no pump for the repeated circulation of the milk through their tubes will have a large evaporation capacity, and as the interiors of their tubes will be flooded with milk from top to bottom, there will be no danger of any milk drying on the inside surfaces of the tubes. The exact height at which the milk level should be maintained in an evaporator like 11 or 23 is subject to some variation, in accordance with the rapidity of boiling, but in any case will not be allowed to rise high enough so that any of the fluid milk will escape through the vapor outlet along with the water vapor. Usually if the sump at the bottom of each drum 21 and 22 is maintained a little more than half full, the fluid milk level will be about right. There will be a constant gravity overflow from the first sump into the next evaporator and from the final evaporator in the series of upward flow evaporators into the downflow pipe such as 69 leading to the falling film evaporator, if such a falling film evaporator is used as the last evaporating unit in the system. In such a last unit a liquid level should be maintained that can be observed in the sight glass 53, thus giving assurance that pump 48 will always be delivering milk to the top of this falling film evaporator.

While I have shown and described herein a preferred form of the invention it should be understood that the invention is not limited to the precise details of construction or operation herein shown and described, but that the invention is susceptible of considerable modification without departure from the scope of the invention defined in the following claim.

I claim:

A multiple concentrating evaporator comprising a plurality of vertical tubular heat exchangers associated in series with regard to liquid flow for successive evaporation of an aqueous solution at successively higher concentrations, each heat exchanger including a vertical tube chest having a plurality of vertical tubes extending therethrough, a centrifugal vapor separation chamber having a horizontal axis and adjoining the top of each tube chest of each exchanger in the series excepting the last in the series, each chamber being in communication with the tubes therein to receive directly therefrom rising streams of vapor and liquid tangentially, means for separating vapor in each said chamber from liquid emerging from the tops of said tubes, means for discharging the vapor centrally and axially from each said chamber, means connected with the bottom of each said chamber for receiving from said chamber by gravity flow and collecting a body of liquid substantially below said vapor discharge means, means for returning most of the liquid from each said collecting means back again to the bottom of the same said tube chest for upward flow again through said tubes, a terminal vertical tubular heat exchanger unit connected to receive partially concentrated solution from the last of said series, a centrifugal vapor separation chamber connected to receive vapor and solution from the lower ends of the tubes of said terminal unit, a pump and means connected therewith and with said unit and the last said chamber for recirculating solution from the last said chamber to the tops of the tubes in said terminal unit for downward flow therethrough, means for supplying tube heating vapor to the heating space in each tube chest from a common source and outlet means for the condensed heating vapor, and means for continuously forwarding from the collecting means associated with each preceding heat exchanger to the liquid returning means of the next succeeding heat exchanger a quantity of partially condensed solution constituting a small fraction of the total amount of solution being recirculated in such preceding heat exchanger.

References Cited in the file of this patent

UNITED STATES PATENTS

| | | |
|---|---|---|
| 378,843 | Lillie | Feb. 28, 1888 |
| 780,612 | Meyer | Jan. 24, 1905 |
| 995,776 | Dunn | June 20, 1911 |
| 1,028,738 | Kestner | June 4, 1912 |
| 2,554,138 | Cross | May 22, 1951 |
| 2,570,213 | Cross | Oct. 9, 1951 |

FOREIGN PATENTS

| | | |
|---|---|---|
| 185,873 | Great Britain | Sept. 21, 1922 |